United States Patent
Itkin et al.

(10) Patent No.: US 11,681,635 B2
(45) Date of Patent: Jun. 20, 2023

(54) SECURE FLASH CONTROLLER

(71) Applicant: MELLANOX TECHNOLOGIES, LTD., Yokneam (IL)

(72) Inventors: Yuval Itkin, Zoran (IL); Yaniv Strassberg, Yokneam (IL); Guy Harel, Haifa (IL); Ahmad Atamlh, Oxford (GB)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/013,693

(22) Filed: Sep. 7, 2020

(65) Prior Publication Data
US 2022/0075737 A1    Mar. 10, 2022

(51) Int. Cl.
| G06F 12/14 | (2006.01) |
| G06F 21/79 | (2013.01) |
| G06F 12/02 | (2006.01) |
| G06F 12/0891 | (2016.01) |

(52) U.S. Cl.
CPC ...... *G06F 12/1408* (2013.01); *G06F 12/0246* (2013.01); *G06F 12/0891* (2013.01); *G06F 21/79* (2013.01)

(58) Field of Classification Search
None
See application file for complete search history.

(56) References Cited

U.S. PATENT DOCUMENTS

| 8,589,700 | B2 | 11/2013 | Herman et al. |
| 8,984,088 | B2 | 3/2015 | Umezuki |
| 10,057,760 | B2* | 8/2018 | Yang ............ H04W 8/205 |
| 2012/0179776 | A1* | 7/2012 | Umezuki ........ H04L 49/357 709/217 |
| 2014/0365785 | A1* | 12/2014 | Deforest ........ G06F 12/0246 713/193 |
| 2016/0277188 | A1* | 9/2016 | Quinn ............ H04L 63/06 |
| 2017/0097773 | A1* | 4/2017 | Camp ............ G06F 12/0246 |

(Continued)

FOREIGN PATENT DOCUMENTS

WO      2014123372 A1     8/2014

OTHER PUBLICATIONS

Yu et al., "Walloc: An Efficient Wear-Aware Allocator for Non-Volatile Main Memory", IEEE 34th International Performance Computing and Communications Conference (IPCCC), pp. 1-8, Dec. 2015.

(Continued)

*Primary Examiner* — Stephanie Wu
(74) *Attorney, Agent, or Firm* — Kligler & Associates Patent Attorneys Ltd

(57) ABSTRACT

A computing device includes a non-volatile memory (NVM) interface and a processor. The NVM interface is configured to communicate with an NVM. The processor is configured to store in the NVM Type-Length-Value (TLV) records, each TLV record including one or more encrypted fields and one or more non-encrypted fields, the non-encrypted fields including at least respective validity indicators of the TLV records, to read the TLV records that include the encrypted fields and the non-encrypted fields from the NVM, and to invalidate selected TLV records by modifying the respective validity indicators of the selected TLV records that are stored in the non-encrypted fields.

13 Claims, 4 Drawing Sheets

(56) References Cited

U.S. PATENT DOCUMENTS

| | | | |
|---|---|---|---|
| 2017/0111330 A1* | 4/2017 | Mosko | H04L 9/3242 |
| 2018/0288127 A1* | 10/2018 | Zaidi | H04L 63/04 |
| 2019/0238312 A1* | 8/2019 | Dickens, III | H04L 9/0643 |
| 2019/0238313 A1* | 8/2019 | Austin | H04L 9/3236 |
| 2020/0045263 A1* | 2/2020 | Uchimura | H04N 21/4334 |

OTHER PUBLICATIONS

EP Application # 21195138.9 Search Report dated Feb. 1, 2022.

* cited by examiner

SECURE FLASH CONTROLLER

FIELD OF THE INVENTION

The present invention relates generally to computer systems, and particularly to methods and systems for handling data storage in computer non-volatile memory.

BACKGROUND OF THE INVENTION

Computer systems often comprise non-volatile memory (NVM) such as a Flash memory that is used for data storage. While providing large storage area at relatively low cost, Flash memories have inherent limitations, including erasure in blocks, a limited number of erase/program cycles and vulnerability to security attacks.

PCT International Publication WO 2014/123372 describes a Flash Translation Layer (FTL) design framework with logs for data, mapping and checkpoint, which supports error recovery, including a first log for processing data; a second log for processing mapping information; and a third log for processing checkpoint information, wherein the first and second logs can recover errors by using the checkpoint information.

U.S. Pat. No. 8,589,700 describes systems and methods for whitening, encrypting and managing data for storage in non-volatile memories, including a system-on-a-chip (SoC) and a non-volatile memory, wherein the SoC includes SoC control circuitry and a memory interface that acts as an interface between the SoC control circuitry and the non-volatile memory; the SoC can also include an encryption module; the memory interface can direct the encryption module to whiten all types of data prior to storage in the non-volatile memory, including sensitive data, non-sensitive data, and memory management data.

SUMMARY OF THE INVENTION

The present invention will be more fully understood from the following detailed description of the embodiments thereof, taken together with the drawings in which:

DETAILED DESCRIPTION OF EMBODIMENTS

Overview

Figure 1A:
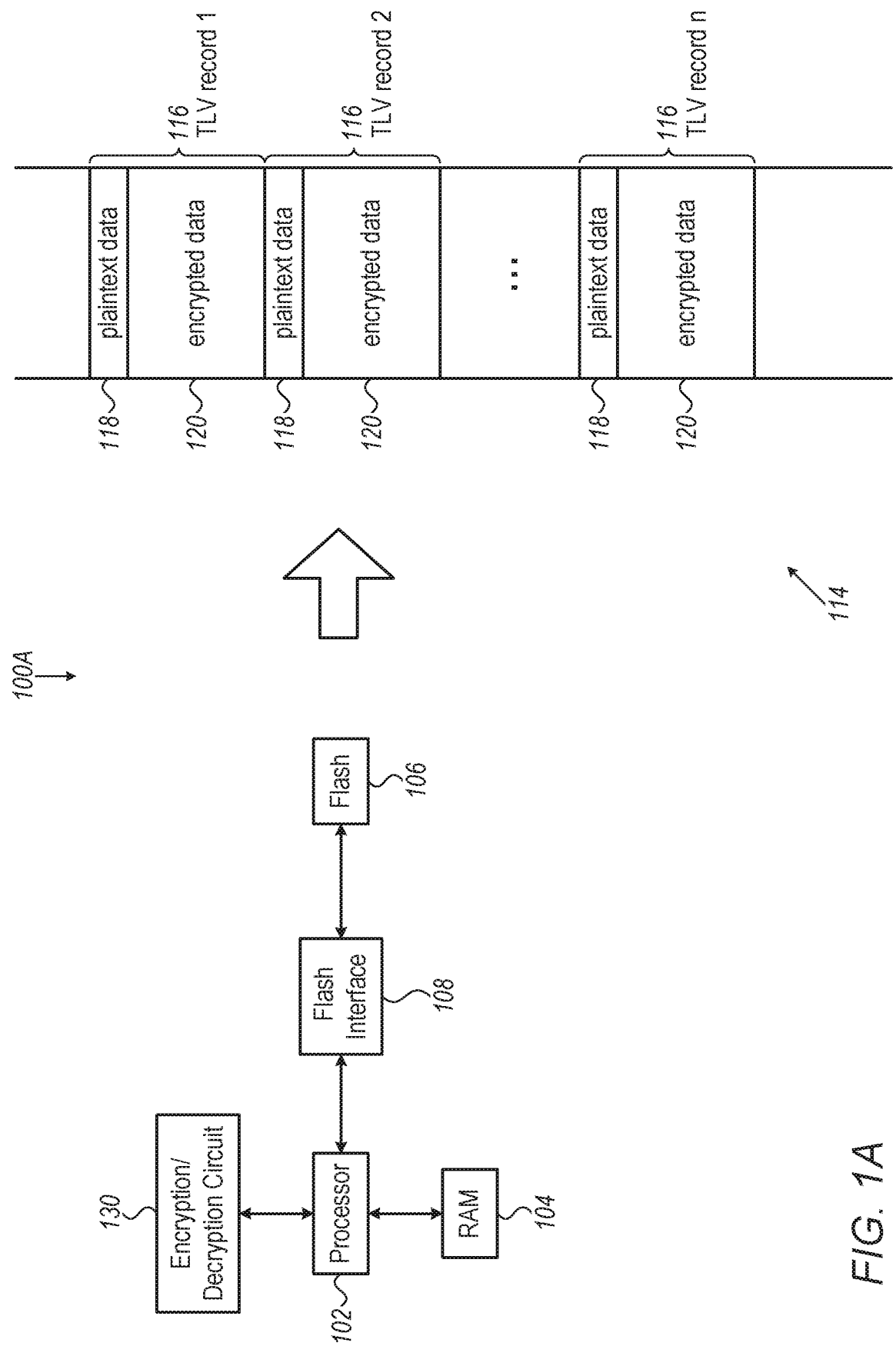
FIG. 1A is a block diagram that schematically illustrates a secure Flash controller, in accordance with an embodiment of the present invention.

Computer systems, which will also be referred to as computing devices, typically comprise a processor (such as a Central Processing Unit (CPU), a Graphic Processing Unit (GPU) or a Microcontroller Computer (MCU)), a primary storage (e.g., Random Access Memory (RAM)), and, often, a non-volatile-memory (NVM) secondary storage, typically for storing program code (e.g., Firmware) and data records. A popular type of NVM, providing a large non-volatile storage area at relatively low cost, is a Flash memory. Flash memories, however, have some inherent limitations in terms of access, aging and vulnerability to security attacks.

Access to a Flash memory by a processor, e.g., a Central Processing Unit (CPU) or Flash controller, is a-symmetric in terms of read vs. write and, in write, in terms of writing logic-0 vs. writing logic-1. While reading is serial and relatively fast, writing, referred to as Programming, as well as Erasing, is much slower. In a typical Flash device, while any bit can be individually programmed to a first binary value (e.g., logic 0), programming to the second binary value (e.g., logic 1) must be done on larger blocks of memory, which are referred to as Pages (programming a page with the second binary value is referred to as Erasing the page). Consequently, to program a page in Flash, the processor typically first erases the page, and then programs the desired data.

To change a part of a pages in the Flash, the processor typically copies the page to a Random-Access Memory (RAM), modifies the part that is to be programmed, erases the page and then reprograms the erased page from RAM.

Aging (also referred to as "wear") is typically defined as—the number of times that Flash cells can be reliably programmed/erased ("P/E cycles"). A typical limit may be 100,000 P/E cycles. If the same page is repeatedly programmed and erased, the life cycle of the page may terminate (and, consequently, the Flash device deemed non-functional) although the P/E cycle count of other pages may be low. When one or more of the Flash pages nears the P/E cycle limit, the reliability of the Flash device severely decreases.

Vulnerability to security attacks. RAMs typically lose storage once the power supply is interrupted, and, hence, are less vulnerable to security attacks; Flash, in contrast, can be read and/or written when the system is turned off; In particular, Flash memories that are external to the computer systems (e.g., Flash devices that plug to the computer system through a Universal Serial Bus (USB) connector) must be protected by cryptographic techniques, which may include encryption and/or authentication.

To mitigate the access and aging limitations, Flash data may be stored in Type-Length-Value (TLV) records, wherein Type typically comprises a TLV status indication field, and data type, Length is the length of the TLV record and Value is the TLV data ("data value"). The indication fields allow adding multiple new records as well as invalidating obsolete records using programming operations, minimizing the number of erase cycles.

To provide security, the processor may encrypt the TLV records prior to programming. However, when TLV records are encrypted, the mechanism described above may fail, since data encryption increases the entropy of the encrypted data and may change all bits.

Embodiments according to the present invention provide for methods and systems wherein data is securely encrypted when stored in Flash memory, and yet TLV record structure is maintained, decreasing the number of erase cycles and, hence, extending the lifespan and the reliability of the Flash device.

In the disclosed embodiments, each TLV record comprises one or more encrypted fields and one or more non-encrypted fields. In an embodiment, fields of the TLV records that are sensitive may be encrypted, whereas insensitive fields may be stored with no encryption (will be referred to as "plaintext fields"; the non-encrypted data will be referred to as "plaintext", stored in "plaintext fields"). In an embodiment, the encrypted fields comprise the data value and the data type, whereas the plaintext fields comprise the indication fields, the length and, sometimes, some of the attributes.

In particular, the processor typically does not encrypt bits that indicate whether the TLV record is valid or invalid. When using this format, the processor is able to invalidate obsolete TLV records, and verify the validity of TLV records, using conventional Flash operations and without having to decrypt information. More generally, encrypting the data while keeping metadata as plaintext is helpful for simplifying management tasks of the processor.

The disclosed techniques therefore extend the life of the Flash device by reducing the number of erase cycles, while maintaining critical data protection. Since fewer encryption and decryption operations are performed, storage throughput and latency can be improved, and power consumption is reduced.

System Description

FIG. 1A is a block diagram that schematically illustrates a secure Flash controller 100, in accordance with an embodiment of the present invention. Flash controller 100, which is sometimes referred to as a Computing Device, comprises a processor 102 (such as a CPU, GPU or MCU); a Random-Access Memory (RAM) 104, configured to temporarily sore data and/or program code; and a Flash interface 108. Flash interface 108 is configured to communicate with a non-volatile memory 106 such as a Flash memory, which stores data records.

According to the example embodiment illustrated in FIG. 1A, Processor 102 communicates with Flash 106 through Flash Interface circuit 108; in some embodiments, Flash 106 supports atomic operations only and Flash Interface 108 may be used to translate Flash erase, program and read operations to atomic Flash operation (e.g., a Processor Flash-program operation may be translated by the Flash Control circuit to a series of program and verify operations, transparently to the processor).

A Flash Storage map 114, on the right-hand-side of the figure, illustrates the structure of the TLV records in Flash 106. Each TLV record 116 comprises one or more plaintext fields 118 that are not encrypted, and one or more encrypted data fields 120. The encrypted data fields are encrypted when written and decrypted when read, using, for example, Advanced Encryption Standard (AES) 256. In an embodiment, the plaintext fields store insensitive data, whereas the encrypted field stores sensitive data.

For fast and secure encryption and/or decryption, Flash controller 100 may further comprise an Encryption/Decryption circuit 130; the processor sends plaintext data and a key to the encryption/decryption circuit, which encrypts the plaintext data and sends the encrypted data back to the processor; to decrypt, the processor sends the encrypted data and a key, and receives the plaintext data.

Figure 1B:
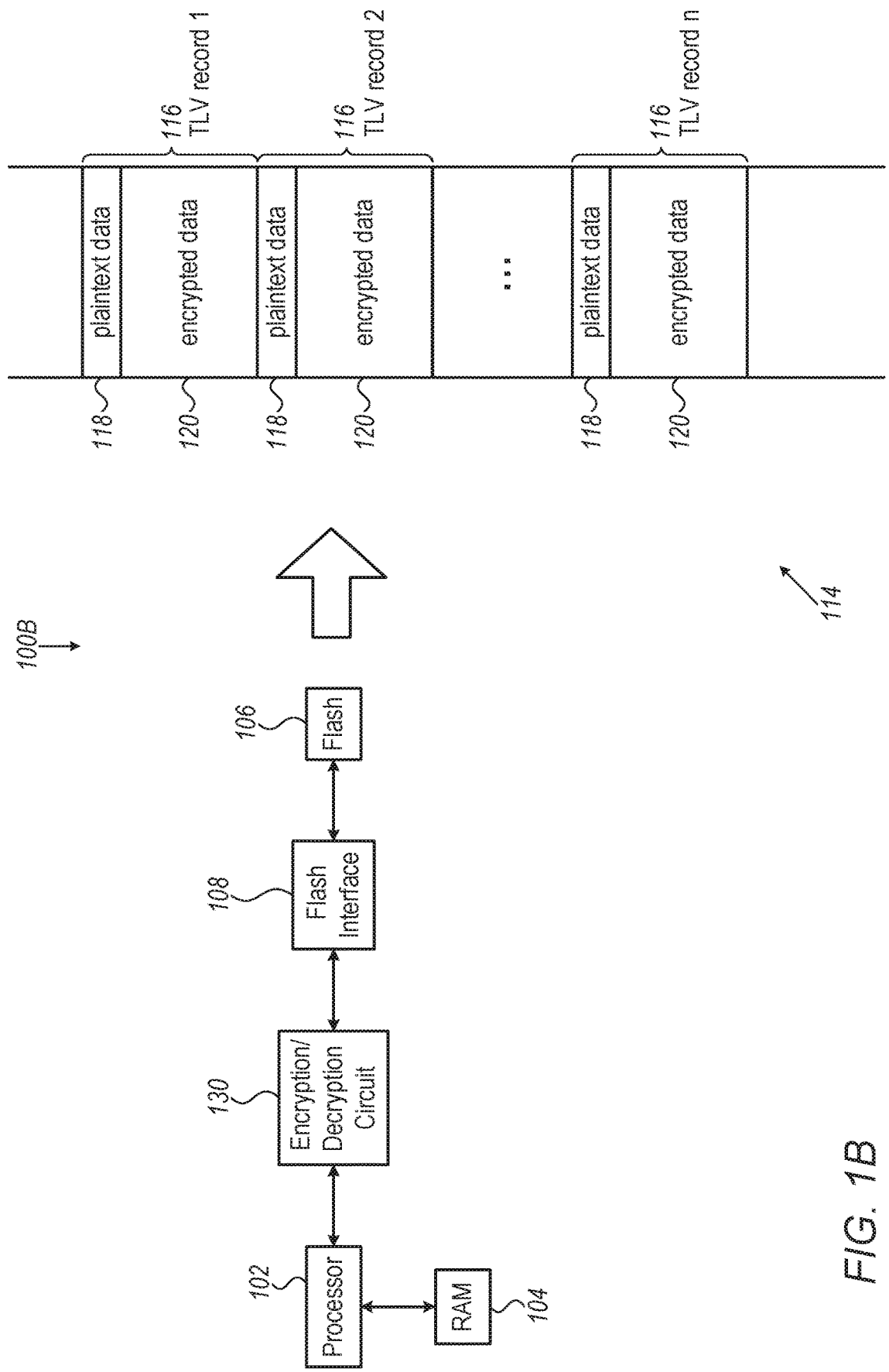
FIG. 1B is a block diagram that schematically illustrates a secure Flash controller, in accordance with another embodiment of the present invention.

FIG. 1B is a block diagram that schematically illustrates a secure Flash controller 100B, in accordance with another embodiment of the present invention. The example embodiment illustrated in FIG. 1B is similar to the example embodiment illustrated in 1A, except that the Encryption/Decryption circuit is placed between the processor and the Flash interface; in Flash Controller 100B the Encryption/Decryption translates between encrypted and plain-text data only.

Thus, according to the example embodiment illustrated in FIG. 1, the sensitive fields of TLV records in a Flash memory are protected by encryption, whereas the non-sensitive fields, including indication fields, are kept in plaintext, allowing a reduced number of erase cycles and hence enhanced reliability.

As would be appreciated, the configurations of Flash controller 100 and its components, and TLV records 116 as shown in FIG. 1, are example configurations that are shown purely for the sake of conceptual clarity. Any other suitable configurations can be used in alternative embodiments. For example, in some alternative embodiments, multiple processors and/or multiple RAMs may be used; in an embodiment, processor 102 encrypts and/or decrypts using software, reducing functionality of Encryption/Decryption circuit 130, or eliminating the Encryption/Decryption circuit altogether.

In embodiments, data transfer between encryption/decryption circuit 130, RAM 104 and Flash Interface 108 may be done directly over a shared bus, using, for example, Direct Memory Access (DMA) or any other protocol.

In yet other embodiments, data encryption/decryption comprises authentication, which may be carried out using an additional circuit, using the encryption/decryption circuit, or using software.

The different elements of Flash controller 100, including all components thereof, may be implemented using suitable hardware, such as in an Application-Specific Integrated Circuit (ASIC) or Field-Programmable Gate Array (FPGA), using software, or using a combination of hardware and software elements.

In some embodiments, processor 102 comprises a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
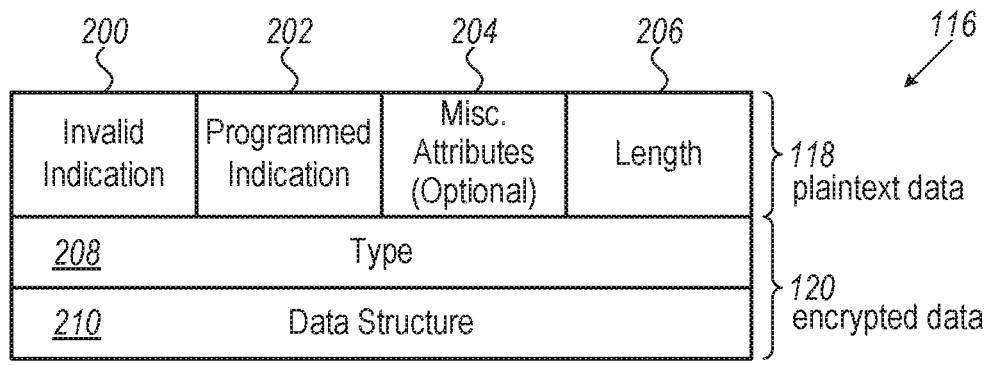
FIG. 2 is a diagram that schematically illustrates the structure of Type-Length-Value (TLV) records, in accordance with an embodiment of the present invention.

FIG. 2 is a diagram that schematically illustrates the structure of TLV records 116, in accordance with an embodiment of the present invention. The TLV record (116, FIG. 1) comprises plaintext fields 118 and encrypted fields 120. According to the example embodiment illustrated in FIG. 2, plaintext fields 118, which are not encrypted, comprise an Invalid indication field 200, a Programmed indication field 202 (Invalid indication field 200 and Programmed indication field 202 typically comprise one bit each), a miscellaneous attributes field 204, which may be used to store record attributes and a length field 206, which indicates the length of the TLV record (e.g., in 32-bit words). (In some embodiments, the plaintext fields are minimized, and miscellaneous attributes field 204 is not used.)

Encrypted fields 120 comprise a Type field 208, which may be used to define the data type (e.g., code, table, etc.) and a Data-Structure field 210 which comprises the data contents of the TLV record.

When a Flash page is erased, all bits are set to an initial value (e.g., logic 1) and, consequently, any TLV records which may have been stored in the page are erased. Erased Programmed and Invalid indicators have a logic-1 value and, hence, are interpreted as not-programmed and not-invalid, respectively.

When the processor checks whether a TLV record is valid, the processor may first verify that the Programmed indication is set, and the Invalid indication is not set. When the processor writes a TLV record, the processor may first verify that the programmed indication of the TLV record is not set. When the processor writes a new TLV record which replaces an existing record, the processor programs the Invalid field of the existing record. (Methods to carry out the read and write operations described above will be presented below, with reference to FIGS. 3 and 4.)

As would be appreciated, the structure of TLV record 116 as shown in FIG. 2, including the various fields thereof, is an example that is shown purely for the sake of conceptual clarity. Any other suitable configurations can be used in alternative embodiments. For example, in some embodiments, additional encrypted and/or non-encrypted fields may be used; in other embodiments, parts of (or all) the miscellaneous Attributes may be encrypted.

In some embodiments, the Programmed indication is not needed. When a page is erased, the length field will be set to zero (in an embodiment, the erasure operation sets all bits to Logic-1, and, hence, the length field uses negative logic). Whenever a page is programmed, the length field is set to a non-zero value. Thus, a non-zero length field may be used to indicate that a page is programmed.

We will now describe methods to manage TLV records 116 in Flash memory 106, according to embodiments of the present invention. In embodiments, for faster operation, processor 102 keeps a TLV descriptor table in RAM 104 (FIG. 1). This table may comprise, for each TLV record 116, a pointer for the TLV location in Flash, mirror images of the programmed and invalid indications (in some embodiments, the descriptor table may also include, for example, mirrors of the miscellaneous attribute fields, and plaintext versions of the type fields). It is assumed that TLV records are stored in the Flash continuously.

Figure 3:
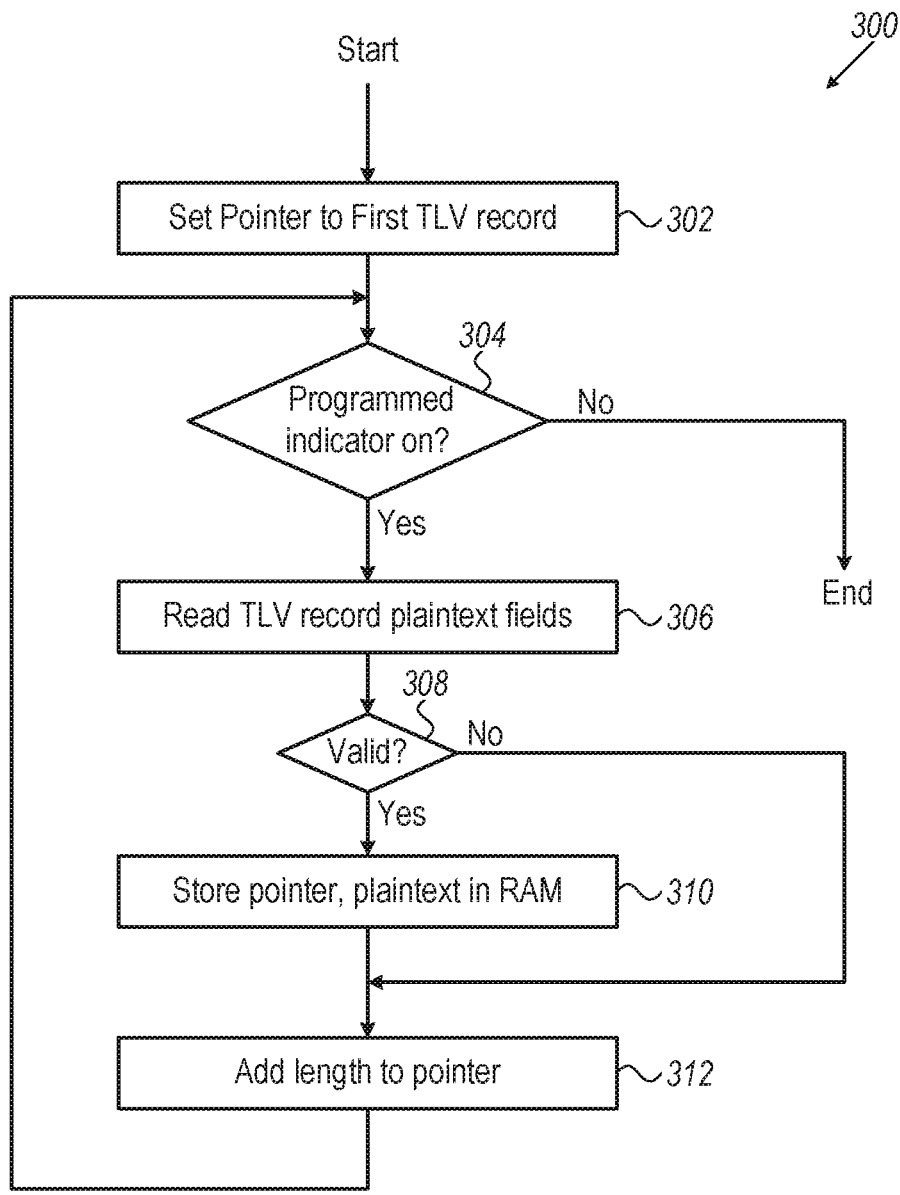
FIG. 3 is a flowchart that schematically illustrates a method for building a TLV descriptor table in RAM, in accordance with an embodiment of the present invention.

FIG. 3 is a flowchart 300 that schematically illustrates a method for building a TLV descriptor table in RAM, in accordance with an embodiment of the present invention. The flowchart is typically executed by processor 102 (FIG. 1) after power-up or other types of hard-reset.

The flow starts at a Set-Pointer step 302, wherein the processor sets a pointer to point at the first TLV record. This location is typically fixed, for example, to the start of the Flash address space. Next, at a Check-Programmed step 304, the processor reads the programmed indication of the TLV record. If the programmed indicator is not set, the current record is the last TLV that is stored in the Flash (as mentioned above, according to the example embodiment illustrated in FIG. 3, TLV records in Flash are contiguous, and the first indication of a non-programmed TLV implies that the previous TLV is the last programmed TLV). If the programmed indicator is set, the processor, in a Read-TLV step 306, reads the plaintext fields of the TLV record and enters a Checking Valid step 308, wherein the processor checks if the INVALID indicator is not set (indicating a valid TLV). If so, the processor will enter a Storing step 310, wherein the processor stores the plaintext of the TLV, including the pointer and, optionally, some other plaintext fields (but not the invalid indicator), in the TLV descriptor table. The processor will then enter an Adding Length step 312.

If, in step 308, the processor identifies that a TLV is marked as Invalid, the processor will skip step 310 and directly enter step 312.

In step 312 the processor adds the length field to the pointer, which will now point to the next TLV record. After step 312 the processor reenters step 304 to examine the next TLV record. If, in step 304, the programmed bit is not set (and, hence, there are no more programmed TLVs in the Flash), the flow ends.

Figure 4:
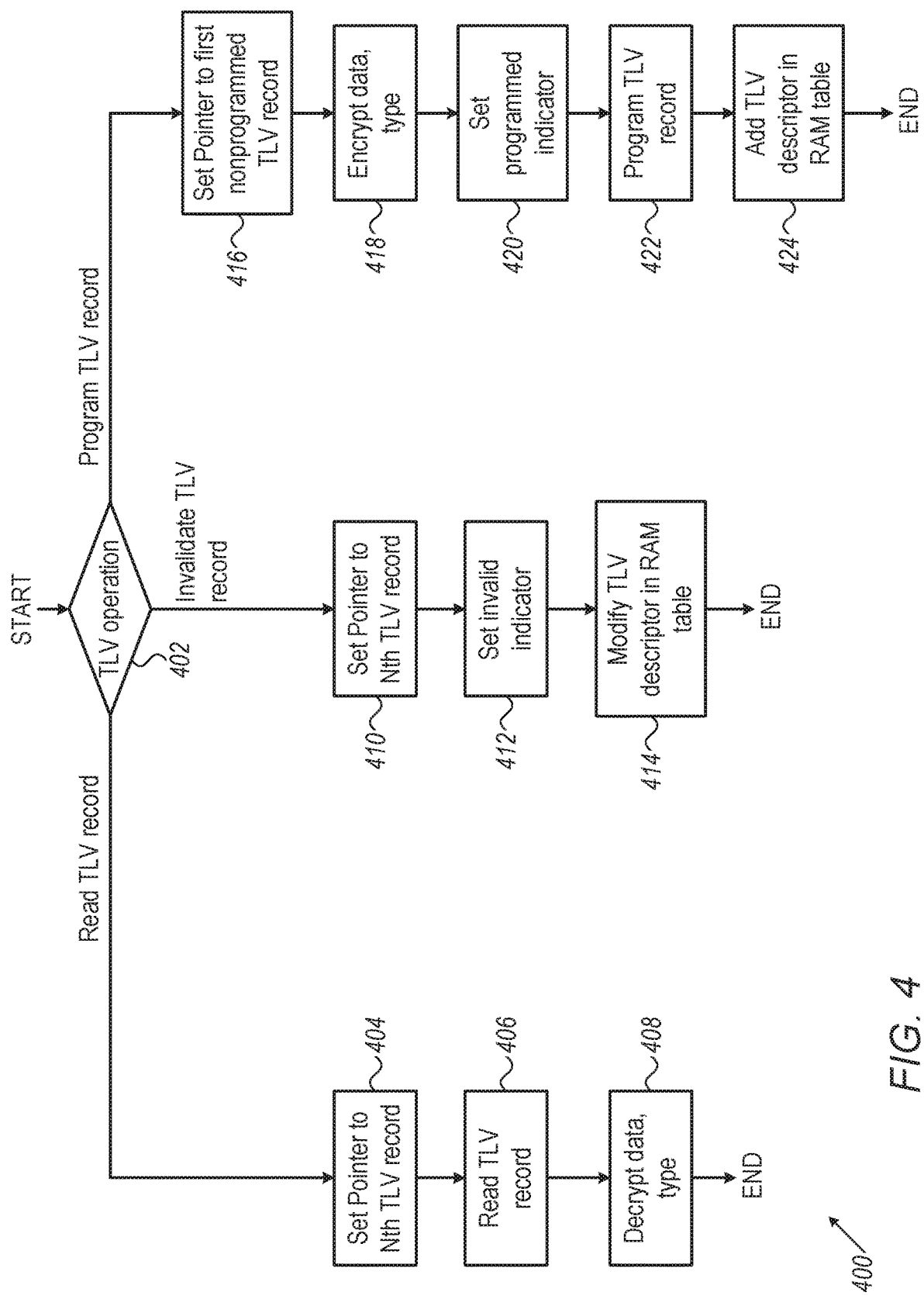
FIG. 4 is a flow chart that schematically illustrates the method to read, program and invalidate a TLV record in the Flash memory, in accordance with an embodiment of the present invention.

FIG. 4 is a flow chart 400 that schematically illustrates a method to read, program and invalidate a TLV record 116 in Flash memory 106, in accordance with an embodiment of the present invention. The flow may be executed by processor 102 (FIG. 1).

The flow starts at a Check Operation step 402, wherein the processor checks which of the three TLV operations should be executed. If the operation is read-TLV record, the processor enters a Set-Pointer step 404 and sets a pointer to the location of the Nth TLV record in the Flash (the location is stored in RAM 104, in the TLV descriptor table). The processor will then, at a Read-TLV step 406, read the TLV record from the Flash; decrypt the encrypted fields in a Decrypt step 408, and end the flow.

If, in step 402, the operation is invalidation of the Nth TLV record, the processor enters a Set-Pointer step 410 and sets the pointer to the location of the Nth TLV record in the Flash (read from the TLV descriptor table). The processor will next, in a Set-Invalid step 412, program the invalid indicator of the TLV record to indicate that the record is not valid and, in a Modify Descriptor step 414, modify the descriptor table to indicate that the Nth TLV record is not valid. The processor will then end the flow.

If, in step 402, the operation is programming of a new TLV record, the processor enters a Set-Pointer step 416 and sets the pointer to the location of the first non-programmed TLV record. The processor then encrypts the encrypted fields in an Encrypt step 418 and, in a Set-Programmed step 420, sets the Programmed indicator to indicate that the current TLV record is programmed. Next, in a Program-TLV step 422, the processor programs the TLV record, including all encrypted and plaintext fields. Lastly, at an Add-Descriptor step 424, the processor adds an entry in the TLV descriptors table which comprises the pointer to the newly added TLV record, and the flow ends.

In summary, the methods described herein with reference to FIGS. 3 and 4 facilitate secure and yet reliable usage of Flash-based TLV records, including maintaining of a descriptor table of Flash TLV records (FIG. 3); and including the reading, programming and invalidating of TLV records (FIG. 4).

As would be appreciated, the methods illustrated in flowcharts 300 and 400 that are described above with reference to FIGS. 4 and 5 are cited by way of example. Methods and flowcharts in accordance with the disclosed techniques are not limited to the description hereinabove. In alternative embodiments, for example, the order of operations may change, some steps could be executed in parallel and some steps may be embedded in other steps. In some embodiments, some or all the steps of the flowcharts may be executed by Flash Control/Interface 108 (FIG. 1) or by other circuitry.

In some embodiments, the structure of the descriptors table may vary. In an embodiment, there is no TLV descriptor table, and the processor calculates pointers to TLV records by serially reading and summing the lengths of consecutive TLV records.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

Although the embodiments described herein mainly address secure Flash, the methods and systems described herein can also be used in other applications, including (but not limited to) any other suitable type of programmable memory (e.g., PROM and EFUSE based memory). It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computing device, comprising:
a non-volatile memory (NVM) interface, configured to communicate with an NVM; and
a processor, configured to:
store in the NVM Type-Length-Value (TLV) records, each TLV record comprising one or more encrypted fields and one or more non-encrypted fields, the non-encrypted fields comprising at least respective validity indicators of the TLV records, wherein, in a given TLV record, the non-encrypted fields comprise one or more indications that a TLV has been programmed, and one or more indications that a programmed TLV is not valid;
read the TLV records that comprise the encrypted fields and the non-encrypted fields from the NVM; and
invalidate selected TLV records by modifying the respective validity indicators of the selected TLV records that are stored in the non-encrypted fields.

2. The computing device according to claim 1, wherein the NVM comprises a Flash memory.

3. The computing device according to claim 1, wherein the encrypted fields comprise data fields of the TLV records.

4. The computing device according to claim 1, wherein the encrypted fields comprise type fields of the TLV records.

5. The computing device according to claim 1, wherein the non-encrypted fields comprise length fields of the TLV records.

6. A method, comprising:
storing, in a non-volatile memory (NVM), Type-Length-Value (TLV) records, each TLV record comprising one or more encrypted fields and one or more non-encrypted fields, the non-encrypted fields comprising at least respective validity indicators of the TLV records;
reading the TLV records that comprise the encrypted fields and the non-encrypted fields from the NVM; and
invalidating selected TLV records by modifying the respective validity indicators of the selected TLV records that are stored in the non-encrypted fields, without decryption of any of the encrypted fields;
wherein, in a given TLV record, the non-encrypted fields comprise one or more indications that a TLV has been programmed, and one or more indications that a programmed TLV is not valid.

7. The method according to claim 6, wherein the NVM comprises a Flash memory.

8. The method according to claim 6, wherein reading a given TLV record comprises reading only the non-encrypted fields of the given TLV record from the NVM, and, when the non-encrypted fields indicate that the given TLV record has been invalidated, refraining from reading or decrypting the encrypted fields.

9. The method according to claim 6, wherein the encrypted fields comprise data fields of the TLV records.

10. The method according to claim 6, wherein the encrypted fields comprise type fields of the TLV records.

11. The method according to claim 6, wherein the non-encrypted fields comprise length fields of the TLV records.

12. The method according to claim 6, wherein storing the TLV records comprises encrypting plaintext data for storage in the NVM, creating one or more TLV records that hold the encrypted plaintext data in the encrypted fields, and storing the one or more TLV records in the NVM.

13. The method according to claim 6, wherein reading the TLV records comprises reading one or more TLV records from the NVM, and extracting plaintext data from the one or more TLV records by decrypting at least some of the encrypted fields.

* * * * *